United States Patent Office 3,560,320
Patented Feb. 2, 1971

3,560,320
INSULATING MATERIAL
Henry A. Letteron, Schenectady, N.Y., assignor to
General Electric Company
No Drawing. Continuation of application Ser. No.
182,968, Mar. 27, 1962. This application Oct. 5,
1967, Ser. No. 673,220
Int. Cl. B32b 5/26, 5/28
U.S. Cl. 161—93                          3 Claims

ABSTRACT OF THE DISCLOSURE

Electrical insulating material is bonded to reinforcing backer material in the preparation of electrical insulating tapes by fused thermoplastic sheet material such as polyethylene, polypropylene, polybutylene, polystyrene, polyvinyl acetate, polyacrylate, cellulose acetate, cellulose acetobutyrate and polyvinyl acetal and blends thereof to provide a porous impregnatable structure.

---

This application is a streamlined continuation of application Ser. No. 182,968 filed Mar. 27, 1962, now abandoned.

This invention relates to composite insulating material. More particularly, it relates to new and improved insulating materials in sheet or tape form and, more specifically, to such materials incorporating a siliceous material, such as asbestos, mica or glass, bonded to a reinforcing backer, such as glass cloth or glass fiber, with a fused resin sheet, and to the method of making such materials.

Insulating sheets and tapes made of reinforced asbestos, mica flakes and glass flakes are well known. Also well known is the preparation of such tapes using reconstituted mica which is described, for example, in Bardet Pat. 2,549,880 and elsewhere. Generally speaking, according to this patent, reconstituted mica is prepared by heating mica to a temperature sufficient to produce cleavage after which the material is comminuted by various methods and reconstituted in the form of a mat, sheet or paper by well known papermaking methods. Other methods of making reconstituted mica can also be used. Such materials as those mentioned above, when used in insulating sheets and tapes, are generally reinforced by glass cloth, glass strands or other strength-imparting material after which the base material is impregnated with a resin to produce a final product with specific desired electrical characteristics. Generally, this impregnating resin is also used to bond the material to the glass cloth or other backer. The use of the impregnating resin in this dual role of impregnation and bonding places definite limitations upon the amount and type of resinous material used. For example, the resin must be chosen not only for its impregnating qualities but also for its ability to bond the base material to the glass cloth, and the fluidity, for example, of the impregnant must be controlled with its bonding role in mind. Additionally, limits are placed upon the amount of resinous material which can be used since it must not only impregnate the base material but also bond it to the backer. Also, the bonding requirement of the resin in some cases necessitates the selection of a resin which is inferior in other impregnant qualities, such as heat life, crush resistance, flexibility, and the like, which might be taken advantage of to a fuller extent if it were not used in its dual role.

From the above it will be quite apparent that there is a need for bonding materials of the type described to glass cloth or other backers in which the bonding material is separate from the resin used to impregnate the structure in order to impart thereto the desirable characteristics, such as those referred to above.

It is therefore a principal object of this invention to provide electrical insulating sheet or tape material having an asbestos, mica or glass flake base, and a glass cloth or other backer, the bonding material used to unite the elements being separate and distinct from any resinous material used to impregnate the structure.

Briefly, the invention relates to reinforced sheets or tapes, the elements of which are bonded together by using a film of polyethylene or other thermoplastic material which has neither a sharp melting point nor high fluidity at elevated temperatures. Typical of such materials besides polyethylene are polypropylene, polybutylene polystyrene, polyvinyl acetals, polyacrylate, cellulose acetate, cellulose acetobutyrate and polyvinyl acetate, among others. Blends of these materials are also useful.

Those features of the invention which are believed to be novel are set forth with particularity in the claims appended hereto. The invention will, however, be better understood from a consideration of the following description.

The present invention is a distinct improvement over prior inventions of the type concerned which use hot melts, solutions, and the like, of thermoplastic materials for bonding purposes, it being simpler and more economical besides permitting the use of different resins for bonding and impregnating. According to one aspect of this invention, separate layers of glass cloth or glass fibers or a composite glass-resin fiber cloth and material such as asbestos, mica or glass flakes, are superimposed, one upon the other, with a thin layer of the present thermoplastic material therebetween. The unbonded laminated composite material is wound into a roll and heated at a temperature and for a time sufficient to fuse the thermoplastic, such temperatures and times being obvious to those skilled in the art. Upon such treatment, it is unexpectedly found that when the rolls are unwound, the thermoplastic layer, as such, has disappeared and firmly bonded the backer material to the base material. Generally speaking, the composite rolls so made are heated at temperatures from about 135° C. to 200° C. for about from 1 to 16 hours after which time they may be unrolled as a firmly bonded laminate. However, the time and temperature of treatment depends upon the particular thermoplastic used.

Alternatively, the present composite materials can be prepared by simultaneously passing over or between heated rolls layers of backer material and base material with a layer of thermoplastic sheet therebetween, the three laminae being continuously joined together by fusion of the interlying material.

After the preparation of the bonded laminate, the base material and the backer can be impregnated with any desired resin to give desirable characteristics which are not dependent upon the additional ability of the resinous material to bond the backer to the base material. Thermoplastic impregnating materials are useful where lower temperatures are to be encountered. Also useful are the thermosetting resins, including, but not limited to, epoxy resins, polyester resins, polyimides, silicones, and the like.

The following examples will illustrate the practice of the invention and are not to be taken as limiting, except as they are so limited by the appended claims.

EXAMPLE 1

Woven glass cloth and ¾ mil polyethylene film, each 13 inches wide, were wound on a 4 inch diameter core. As the polyethylene film passed to the windup core, one of its surfaces was covered with a layer of overlapping flakes of No. 4 book pack mica splittings. The composite roll so prepared was wrapped in a polyethylene terephthalate film to protect the edges of the roll and placed in an oven at 170° C. for one hour. After cooling, the wrapping was removed and the roll unwound and examined. It was found that the mica splittings were bonded tightly to the glass cloth by the polyethylene film at all points where there was contact between the three layers.

EXAMPLE 2

Glass cloth sheet 13 inches wide was covered with an overlapping layer of No. 6 loose dust packed mica splittings and wound onto a core with a .0005 inch thick layer of polyethylene film. After about 75 feet of material had thus been wound up, the roll was wrapped in polyethylene terephthalate film and baked for about 75 minutes at 160° C. Once again, when the roll was unwrapped, it was found that there was tight adhesion between the three layers wherever they were in contact.

EXAMPLE 3

A matted asbestos-glass fiber paper 5 mils thick, known as Novabestos and manufactured by the Raybestos-Manhattan Company, overlaid with a polypropylene film one mil thick, in turn overlaid by a glass fiber cloth was passed simultaneously under tension under one and over another successively arranged 4 inch outer diameter aluminum pipes having surface temperatures of about 200° C. The pipes were so arranged that the material was in contact with about one-third of the surface or about 4 inches of the perimeter of each pipe, the composite web being wound up at a linear speed of about 4 feet per minute giving a contact time of about 5 seconds on each of the two hot surfaces. It was found that the polypropylene film softened and formed a strong bond between the glass cloth and glass asbestos material without penetrating either material to any appreciable extent. The resulting laminate was flexible with an appreciably higher tensile and tear strength than that of the original glass-asbestos paper.

EXAMPLE 4

A sheet of 4 mil thick mica mat superimposed by a ¾ mil polyethylene film and in turn by a glass cloth layer was passed simultaneously through the equipment described in Example 3, the linear speed being about 2 feet per minute so that the contact time was about 10 seconds on each of the two hot surfaces. After passage over the rolls, the glass cloth and mica mat were found to have formed a firmly adhering laminate with little or no penetration of the polyethylene into either the glass cloth or the mica mat.

EXAMPLE 5

The unbacked surface of the material of Example 4 was bonded to glass cloth by again passing it through the equipment with an interleaving polyethylene film ¾ mil thick, the resulting material being a three-layer laminate of 4 mil mica mat faced on each surface with glass cloth.

EXAMPLE 6

Glass cloth 1.7 mils thick and about 40 inches wide, polyethylene film about 0.0005 inch thick and 39 inches wide, and 40 inches wide of mica mat 2 mils in thickness were wound simultaneously on a core, wrapped in polyethylene terephthalate film and baked for 6 hours in a 175° C. oven. The resulting material was a firmly bonded laminate with the polyethylene film no longer visible. The glass cloth face of the above material was treated by reverse roll coating with a resinous solution containing 80 percent of polymerized ester consisting essentially of Nadic anhydride and propylene glycol and 20 percent of a polymerized ester of adipic acid, maleic anhydride and propylene glycol. (Nadic anhydride is the adduct of cyclopentadiene and maleic anhydride.) The dried laminate was found to be suitable as a wrapper or tape for insulating the coils of electrical machinery. When heated to a temperature of about 135° C. under a pressure of 100 p.s.i., the successive layers of this bonded laminate could in turn be bonded together to form a dense insulating structure having a dielectric strength of 1500 volts per mil.

EXAMPLE 7

A laminate prepared as in Example 6 above and consisting of 1.7 mil thick glass cloth and 2 mil thick mica mat bonded with ½ mil thick polyethylene film was treated with a methyl phenyl silicone resin. It was found that this material was suitable for insulating electrical conductors for applications as high as 180° C.

EXAMPLE 8

A laminate, such as that of Example 6, was treated with an epoxy resin formulation and dried to form a flexible, continuous laminate suitable for insulating the coils of electrical machinery.

The tapes of the present invention are useful wherever sheet or tape material of the types described is required. They are, of course, particularly useful for electrical insulating purposes particularly when impregnated with a suitable resinous material. After application, they can be molded under heat or heat and pressure to a solid unitary mass. It will be appreciated, of course, that the tape may be applied to a structure either in the impregnated or unimpregnated state. In the latter case the resinous impregnating material is applied in situ. The resin impregnated tapes of the invention are particularly useful for insulating electrical coils such as armature coils, field coils, impulse coils, transformer coils and for induction heater use. It will also be appreciated that the present materials may be prepared using metal foil materials as the backer material for the mica paper, mica flake or other dielectric material, in which case they are very useful for constructing electrical capacitor rolls or sections. Of course, the unimpregnated tape itself with backer can be interleaved with separate layers of foil in constructing capacitors.

What is claimed is:

1. A porous composite tape comprising a porous base layer of electrical insulating material selected from mica flake, mica paper, glass flake, asbestos and asbestos fiberglass fiber mat and a porous reinforcing layer selected from glass fabric and glass fiber-resin fiber fabric bonded together with a thermoplastic material selected from the group consisting of polyethylene, polypropylene, polybutylene, polystyrene, polyvinyl acetate, polyacrylate, cellulose acetate, cellulose acetobutyrate, polyvinyl acetal and blends thereof.

2. A tape as in claim 1 wherein said base layer is reconstituted mica.

3. A tape as in claim 2 wherein said base layer is mica flake.

References Cited

UNITED STATES PATENTS

| | | | |
|---|---|---|---|
| 2,892,972 | 6/1959 | Ross | 317—258 |
| 2,993,949 | 7/1961 | Moebius et al. | 161—195 |
| 3,000,772 | 9/1961 | Lunn | 161—203 |
| 3,026,222 | 3/1962 | Rogers, Jr. et al. | 161—163 |
| 3,101,845 | 8/1963 | Heasley | 161—163 |
| 3,127,470 | 3/1964 | Andersson et al. | 174—121 |
| 3,245,854 | 4/1966 | Etchison et al. | 161—154 |

WILLIAM J. VAN BALEN, Primary Examiner

U.S. Cl. X.R.

161—156, 158, 163, 171, 203, 205, 247; 174—121; 317—258

PO-1050
(5/69)

UNITED STATES PATENT OFFICE
CERTIFICATE OF CORRECTION

Patent No. 3,560,320      Dated February 2, 1971

Inventor(s) Henry A. Letteron

It is certified that error appears in the above-identified patent and that said Letters Patent are hereby corrected as shown below:

Claim 3, line 1, delete "2" and substitute therefor - 1 -

Signed and sealed this 11th day of May 1971.

(SEAL)
Attest:

EDWARD M. FLETCHER, JR.      WILLIAM E. SCHUYLER,
Attesting Officer      Commissioner of Patents